United States Patent
Matsunobu et al.

(10) Patent No.: US 8,387,167 B2
(45) Date of Patent: Mar. 5, 2013

(54) METHOD FOR FORMING RESIN SURFACE, METHOD FOR MANUFACTURING ARTICLE WHICH FORMS RECESSED PORTIONS DIFFERENT IN SIZE RANDOMLY ON SURFACE THEREOF AND ARTICLE MANUFACTURED BY THE METHOD, AND METHOD FOR MANUFACTURING GLOVES AND GLOVES MANUFACTURED BY THE METHOD

(75) Inventors: Kazutaka Matsunobu, Kurume (JP); Nobuyoshi Koga, Kurume (JP); Yukiko Tsuchimochi, Kurume (JP)

(73) Assignee: Towa Corporation Ltd., Fukuoka (JP)

(*) Notice: Subject to any disclaimer, the term of this patent is extended or adjusted under 35 U.S.C. 154(b) by 468 days.

(21) Appl. No.: 12/532,920

(22) PCT Filed: Mar. 27, 2008

(86) PCT No.: PCT/JP2008/055874
§ 371 (c)(1),
(2), (4) Date: Sep. 24, 2009

(87) PCT Pub. No.: WO2008/123356
PCT Pub. Date: Oct. 16, 2008

(65) Prior Publication Data
US 2010/0107304 A1    May 6, 2010

(30) Foreign Application Priority Data

Mar. 30, 2007 (JP) ................. 2007-094123
Mar. 25, 2008 (JP) ................. 2008-078937

(51) Int. Cl.
*A41D 19/00*    (2006.01)

(52) U.S. Cl. ........................................................ 2/161.1
(58) Field of Classification Search ................... 2/161.1, 2/161.6, 167, 169
See application file for complete search history.

(56) References Cited

U.S. PATENT DOCUMENTS

| | | | | |
|---|---|---|---|---|
| 2,393,298 A * | 1/1946 | De Laney et al. | ................ | 2/168 |
| 4,329,312 A * | 5/1982 | Ganz | ............................. | 264/306 |
| 4,497,072 A * | 2/1985 | Watanabe | ......................... | 2/169 |
| 6,440,498 B2 * | 8/2002 | Schaller | ......................... | 427/261 |
| 7,771,644 B2 * | 8/2010 | Flather et al. | ................. | 264/307 |

FOREIGN PATENT DOCUMENTS

| | | |
|---|---|---|
| JP | 59-163403 | 9/1984 |
| JP | 61-275406 | 12/1986 |
| JP | 1-258917 | 10/1989 |
| JP | 2639415 | 5/1997 |
| JP | 11-192663 | 7/1999 |
| JP | 2002-249909 | 9/2002 |

* cited by examiner

Primary Examiner — Katherine Moran
(74) Attorney, Agent, or Firm — Jordan and Hamburg LLP

(57) ABSTRACT

A method for forming a resin surface on which recessed portions different in size are formed randomly includes: forming first recessed portions by allowing all or some granular and/or powdery adhering material to adhere to a surface of an unset resin composition containing air bubbles so that at least a portion of the granular and/or powdery adhering material bites into the surface and by removing the adhering material after the resin composition is set; and forming second recessed portions smaller than the first recessed portions in size by allowing some of the air bubbles contained in the unset or set resin composition to open on the aforementioned surface of the resin composition.

3 Claims, 8 Drawing Sheets

METHOD FOR FORMING RESIN SURFACE, METHOD FOR MANUFACTURING ARTICLE WHICH FORMS RECESSED PORTIONS DIFFERENT IN SIZE RANDOMLY ON SURFACE THEREOF AND ARTICLE MANUFACTURED BY THE METHOD, AND METHOD FOR MANUFACTURING GLOVES AND GLOVES MANUFACTURED BY THE METHOD

BACKGROUND OF THE INVENTION

The present invention relates to a method for forming a resin surface, a method for manufacturing an article which forms recessed portions different in size on a surface thereof, an article manufactured by the method, a method for manufacturing gloves, and gloves manufactured by the method, and more particularly to an article or gloves which exhibits an excellent non-slip effect and flexibility.

For example, as a method for forming surface unevenness on a surface of work gloves, there has been proposed a method which uses water-soluble powder or granular substances such as ordinary salt (see patent document 1, for example). That is, a rubber gloves mold is immersed in a latex composition, and is pulled up from the latex composition thus forming a coating film made of the latex composition on a surface of the mold. Ordinary salt is scattered and adhered to the unset latex coating film, the coating film is vulcanized by directly heating the rubber gloves mold and, thereafter, ordinary salt is removed by washing with water. In such a manner, rubber gloves having a rubber film which forms fine recessed portions on a surface thereof are obtained.

Patent document 1: Japanese Patent No. 2639415 (see FIG. 1)

SUMMARY OF THE INVENTION

The work gloves which are obtained by the method described in patent document 1 exhibit a non-slip effect due to the surface irregularities formed on the surface of the rubber film.

In general, from a viewpoint of allowing the work gloves to ensure strength, it is desirable that a resin film has a large thickness. However, when the thickness of the resin film is large, the work gloves exhibit poor flexibility, worsen a wearing feeling of a user, and worsen operability of a user, particularly operability of a fingertip of the user thus making it difficult for the user to carry out a fine operation. That is, the work gloves have a drawback that the increase of the thickness of the work gloves and the flexibility of the work gloves cancel each other.

The work gloves obtained by the method described in patent document 1 also have this drawback.

The inventors of the present invention have made extensive studies to overcome the above-mentioned drawback and have focused their attentions on the impregnation of air bubbles into a resin film. Then, air bubbles are impregnated into a resin composition, glove substrate is immersed into the resin composition and, thereafter, work gloves are manufactured by the technique described in patent document 1. It is found that, compared to gloves which are manufactured without impregnating air bubbles into a resin composition, the manufactured work gloves possess flexibility and exhibit an excellent effect also with respect to slip prevention. The present invention has been completed based on such finding.

Accordingly, it is an object of the present invention to provide a method for forming a resin surface which exhibits an excellent non-slip effect and flexibility, a method for manufacturing an article which forms recessed portions different in size randomly on a surface thereof and an article manufactured by the method, and a method for manufacturing gloves and gloves manufacture by the method.

To achieve the above-mentioned object, the present invention adopts the following means.

Although symbols used in the drawings are described with a parenthesis, respective constitutional elements of the present invention are not limited to constitutional elements described in the drawings.

Further, the term "air bubbles" used in Claims, Specification and Abstract of this patent application is used in a context that the term implies not only portions containing a gas in liquid or in a solid body but also portions where a portion or a major portion of an air bubble appears and opens on a surface of the solid body thus forming a recessed portion which does not contain a gas.

The present invention is directed to a method for forming a resin surface on which recessed portions different in size are formed randomly, wherein the method includes the steps of: forming first recessed portions by allowing granular and/or powdery adhering material to adhere to a surface of an unset resin composition containing air bubbles in a state where a part or the whole of the granular and/or powdery adhering material bites into the surface and by removing the adhering material after the resin composition is set; and forming second recessed portions smaller than the first recessed portions in size by allowing the air bubbles contained in the unset or set resin composition to open on a surface of the resin composition.

The present invention is directed to a method for manufacturing an article having a resin surface on which recessed portions different in size are formed randomly, wherein the method includes the steps of forming first recessed portions by allowing granular and/or powdery adhering material to adhere to a surface of an unset resin composition containing air bubbles in a state where a part or the whole of the granular and/or powdery adhering material bites into the surface and by removing the adhering material after the resin composition is set; and forming second recessed portions smaller than the first recessed portions in size by allowing the air bubbles contained in the unset or set resin composition to open on a surface of the resin composition.

The present invention is directed to an article having a resin surface on which recessed portions different in size are formed randomly, wherein the article includes first recessed portions which are formed by allowing granular and/or powdery adhering material to adhere to a surface of an unset resin composition containing air bubbles in a state where a part or the whole of the granular and/or powdery adhering material bites into the surface and by removing the adhering material after the resin composition is set; and second recessed portions which are smaller than the first recessed portions in size and are formed by allowing the air bubbles contained in the unset or set resin composition to open on a surface of the resin composition.

The present invention is directed to a method for manufacturing gloves which form recessed portions different in size randomly on a surface of a resin film thereof, wherein the method includes the steps of: forming first recessed portions (31) by forming an unset resin film (3) using a resin composition containing air bubbles and, thereafter, by allowing granular and/or powdery adhering material to adhere to a surface of the resin film (3) in a state where a part or the whole of the granular and/or powdery adhering material bites into the surface of the resin film (3) and by removing the adhering material after the resin film (3) is set; and forming second recessed portions (32) smaller than the first recessed portions (31) in size by allowing the air bubbles (4) contained in the unset or set resin film (3) to open on a surface of the resin film (3).

The present invention is directed to gloves which include recessed portions different in size randomly, wherein the first recessed portions (31) and second recessed portions (32) which are smaller than the first recessed portions (31) in size are formed on a surface of a resin film (3) containing air bubbles (4), the first recessed portions (31) are formed of traces on the surface of the resin film (3) after removing granular and/or powdery adhering material which are adhered to the resin film (3) in a state where a part or the whole of the granular and/or powdery adhering material bites into the surface of the resin film (3); and the second recessed portions (32) are formed by allowing the air bubbles (4) contained in the resin film (3) to open.

The present invention provides gloves which include at least a resin film (2) containing no air bubbles (4) underneath the resin film (3) which contains the air bubbles (4).

The present invention provides gloves in which an average diameter of the air bubbles contained in the resin film (3) may be 100 µm or less.

Further, the present invention provides gloves in which a quantity of air bubbles contained in the resin film (3) may be 5 to 30 vol %.

Still further, the present invention provides gloves in which a quantity of air bubbles contained in the resin film (3) may be 5 to 10 vol %.

The present invention having the above-mentioned constitutions acquires following advantages.

(a) According to the method for forming a resin surface of the present invention, the first recessed portions are formed by allowing the granular and/or powdery adhering material to adhere to the surface of the unset resin composition containing air bubbles in a state where a part or the whole of the granular and/or powdery adhering material bites into the surface and by removing the adhesive materials after the resin composition is set, and the second recessed portions smaller than the first recessed portions in size are formed by allowing the air bubbles contained in the unset or set resin composition to open on the surface of the resin composition. Accordingly, compared to a method which forms only the first recessed portions by removing the adhering material, it is possible to largely increase the number of recessed portions per a unit surface area. As a result, the resin surface exhibits an excellent non-slip effect.

Further, compared to the resin composition in which air bubbles are not contained, air bubbles are contained in the set resin composition and hence, the latter resin composition exhibits excellent flexibility even when these resin compositions have the same thickness.

(b) According to the method of the present invention for manufacturing an article which forms recessed portions different in size randomly on a surface thereof, it is possible to manufacture the article having the resin surface which exhibits an excellent non-slip effect and flexibility.

(c) The article of the present invention which forms recessed portions different in size randomly on a surface thereof has the resin surface exhibiting an excellent non-slip effect and flexibility.

(d) According to the method of the present invention for manufacturing gloves, it is possible to manufacture gloves which exhibit an excellent non-slip effect and flexibility.

(e) The gloves of the present invention exhibit an excellent non-slip effect and flexibility.

(f) According to the gloves which include at least the resin film containing no air bubbles underneath the resin film which contains the air bubbles, the resin film which contains no air bubbles prevents the penetration of liquid such as water or oil and hence, when a user handles liquid such as water or oil while wearing the gloves, it is possible to prevent the infiltration of liquid to a hand side.

DETAILED DESCRIPTION OF THE INVENTION

Figure 1:
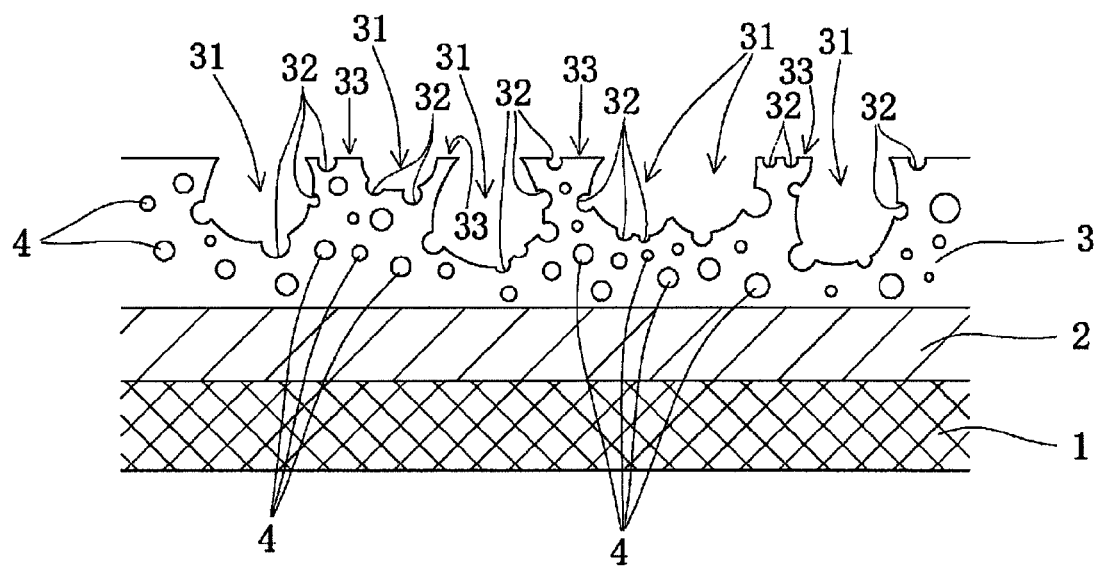
FIG. 1 is an enlarged explanatory view showing a portion of gloves according to an embodiment 1 in cross section.

An object to which the present invention is applicable is not particularly limited. As specific objects, it is possible to name, for example, gloves, socks, a mat, a cushion, a carpet, a table cloth, a Japanese cushion, a pillow cover, a bag, a shoulder strip of a bag, a hat having a portion which is in contact with a head of a user and to which non-slip working is applied, a medical-use suspension member for bone fracture, a packaging belt and the like and, further, various kinds of non-slip members which impart a non-slip function to articles.

Hereinafter, the explanation is made by taking the gloves as an example.

Gloves which constitute an object to which the present invention is applied are non-support-type gloves which are formed of a resin film without using a glove substrate and support-type gloves which are formed of a glove substrate and a resin film which is formed on a surface of the glove substrate.

In both types of gloves, recessed portions according to the present invention can be formed on a surface of the resin film. The recessed portions may be formed on the whole surface of the resin film or may be partially formed on the surface of the resin film.

The glove substrate may be formed using knitted fabric or woven fabric. The material of the glove substrate is not particularly limited, and following various kinds of known materials can be used. For example, it is possible to name natural fibers such as cotton, cotton cloth, hemp and wool or synthetic fibers such as nylon fibers, vinylon fibers, vinylidene fibers, polyvinylchloride fibers, polyester fibers, polyurethane fibers, rayon fibers, cupro fibers, acetate fibers, acrylic fibers, polypropylene fibers, polyethylene fibers, fluorocarbon fibers, polychlal fibers, aramid fibers, celluloses and grass fibers.

To enhance the adhesiveness of the glove substrate with a resin composition, various kinds of surface treatment such as cleaning of the material, fluffing of the material or mixing of an additive into the material may be applied to the surface.

As a method for allowing the resin composition to contain air bubbles therein, a mechanical foaming method and a chemical foaming method can be named.

In the mechanical foaming method, by agitating the resin composition using an agitator such as a mixer, the resin composition can contain air bubbles therein.

In the chemical foaming method, by adding a foaming agent to the resin composition and by forming the foaming agent into air bubbles in the resin composition with heat applied at the time of forming gloves, the resin composition can contain air bubbles therein.

By setting the resin composition, it is possible to obtain the non-supported-type gloves which contains air bubbles therein or the supported-type gloves which allows the resin film to contain air bubbles therein.

The foaming agent is a chemical which is also used for manufacturing a sponge-made product. The foaming agent is thermally decomposed and generates a gas such as a carbon dioxide gas, a nitrogen gas and ammonia thus forming the air-bubble structure. As a specific example of the foaming agent, it is possible to name an inorganic foaming agent such as sodium bicarbonate or ammonium carbonate, or an organic foaming agent such as a nitroso compound, an azo compound or a sulfonyl hydrazide.

It is considered in general that the mechanical foaming method can disperse air bubbles more uniformly or more substantially uniformly in the resin composition compared to the chemical foaming method. When the air bubbles can be dispersed uniformly or substantially uniformly, air bubbles contained in the resin film which is formed due to setting of the resin also can be dispersed uniformly or substantially uniformly.

Accordingly, the second recessed portions which are formed by opening of the air bubbles on a surface of the resin film are dispersed in a surface of the resin film uniformly or substantially uniformly and hence, it is possible to acquire a non-slip effect over the whole resin film uniformly or substantially uniformly. Further, by preventing the aggregation of the second recessed portions, it is possible to prevent the deterioration of appearance of a product.

It is preferable that a quantity of air bubbles contained in the resin film amounts to 5 to 30 vol % with respect to a unit volume of the resin film. When the quantity of the air bubbles is less than 5 vol %, a sufficient non-slip effect cannot be obtained and hence, such a quantity is not desirable. When the quantity of the air bubbles is more than 30 vol %, although a sufficient non-slip effect and flexibility can be obtained, wear resistance is deteriorated thus lowering the durability of the resin film and hence, such a quantity is also not desirable.

As the resin composition for forming the resin film, rubber latex and resin emulsion can be named.

As the rubber latex, rubber latex made of natural rubber (NR) can be named. Further, as the resin emulsion, a thermosetting resin or a thermoplastic resin can be named.

As the thermosetting resin, acrylonitrile-butadiene rubber (NBR), styrene-butadiene rubber (SBR), ethylene propylene rubber (EPM, EPDM), hydrogenerated substance NBR (H-NBR), ethylene vinyl acetate copolymer (EVA), butyl rubber (IIR), butadiene rubber (BR), chloroprene rubber (CR), chlorosulfonated polyethylene (CSM), isoprene rubber (IR), chlorinated polyethylene (CPE), nitrile isoprene rubber (NIR), acrylic rubber (ACM), silicone rubber (Si), fluororubber (FPM) and the like can be named, and these materials can be used in a single form or in combination.

As the thermoplastic resin, a polyvinylchloride resin (PVC), an acrylic resin (ACR), an urethane resin (PU), polyethylene (PE), polypropylene (PP), polystyrene (PS), polyvinyl butylal (PVB), polyvinyl alcohol (PVA), polyvinyl acetate (PVAc), chlorinated polyether, ethylene vinyl acetate copolymer (EVA), styrene acrylonitrile copolymer (AS), ABS, polyacetal (PA), nylon, cellulose, polycarbonate (PC), phenoxy, polyester (PETP), a fluororesin and the like can be named, and these materials can be used in a single form or in combination.

A thickness of the resin film is preferably set to 0.05 to 2 mm. The larger the thickness of the resin film, a portion of the resin film having the large thickness tends to increase hardness thereof.

The smaller the thickness of the resin film, the flexibility of the resin film is increased and hence, it is possible to enhance the fitting property of gloves or the comfortable feeling that a user's hand perceives. However, the smaller the thickness of the resin film, strength of the gloves is lowered. Accordingly, when gloves are used in a heavy work, it is necessary to increase the thickness of the resin film of the gloves to some extent.

Further, softness and texture of the resin film largely differ depending on a material of the resin film. For example, even when resin films have the same thickness, a resin film made of a material having low modulus such as natural rubber or soft polyvinyl chloride tends to be soft and a resin film made of a material having high modulus such as nitrile rubber tends to be hard.

As a method for manufacturing the resin film from the resin composition, a coagulation method, a heat sensitive method, a straight method and the like can be named.

The coagulation method is a method in which resin composition is formed into a gel state by salt coagulation. As a coagulating agent, a methanol solution or an aqueous solution in which metallic salt such as calcium nitrate or calcium chloride is dissolved is used. The heat sensitive method is a method in which resin composition is formed into a gel state by adding a heat-sensitive agent into a compounding liquid in advance and by forming the compounding agent into a gel state. The straight method is a method in which resin composition is formed into a gel state by drying without using a coagulating agent or a heat-sensitive agent.

As compounding agents of the resin composition, a stabilizer, a cross-linking agent, a cross-link dispersion, an antioxidant, a thickener, a plasticizer, an antifoaming agent and the like can be named, and kinds and amount of agents can be suitably adjusted corresponding to the usage or the application of gloves.

Among the above-described compounding agents, the cross-link dispersing agent can be obtained by dispersing solid materials including a cross-link accelerator such as BZ, TT, CZ and PZ, a cross-link promoter such as zinc flower or an antioxidant into water in addition to a cross-linking agent such as sulfur and peroxide. The cross-link dispersing agent is mainly used in a case where the resin composition is formed of rubber latex. By using the cross-link dispersing agent, it is possible to allow rubber molecules to bond to each other in the network structure thus enhancing the physical properties such as the strength of the resin film.

When a user handles a liquid such as water or oil with gloves, due to the porosity of the resin film containing air bubbles, there exists a possibility that the liquid penetrates the resin film and reaches a hand side. For preventing such a phenomenon, it is preferable to form a resin film containing no air bubbles on a lower side of the resin film containing air bubbles. Here, resin film containing no air bubbles functions as a penetration preventing film which prevents the penetration of liquid.

By providing the resin film containing no air bubbles, the strength of the gloves can be also enhanced. The resin film containing no air bubbles can be formed using the same material as the resin composition for forming the resin film containing air bubbles. The use of the same material in forming the resin film containing no air bubbles is preferable from a viewpoint of ensuring sufficient adhesiveness between the resin film containing no air bubbles and the resin film containing air bubbles. When gloves are not used in handling liquid such as water or oil, the resin film containing no air bubbles which functions as the penetration preventing film may be omitted.

(Manufacturing Steps of Gloves)

One example of a manufacturing method of the support-type type gloves is explained in order of steps. However, the order of manufacturing steps is not particularly limited to such an order. Here, the resin film is formed by the coagulation method.

(1) A knitted glove substrate is put on a hand mold and a temperature of the hand mold is adjusted, and the hand mold covered with the glove substrate is immersed into a coagulating agent.

(2) The hand mold covered with the glove substrate is further immersed into a resin composition, and the hand mold covered with the glove substrate is pulled up from the resin composition and is dried. Such immersion and drying is repeated several times when necessary. Due to such a step, a resin film containing no air bubbles which functions as a penetration preventing film is formed. The resin composition used for forming the surface film containing no air bubbles may be equal to or different from a resin composition used for forming a resin film containing air bubbles described later.

(3) Thereafter, the hand mold covered with the glove substrate and the resin film is immersed into a resin composition which is formed by mechanical foaming or a resin composition which is formed by adding a chemical foaming agent thereto, and adhering material is adhered to the resin composition in a state where a part or the whole of the adhering material bites into a surface of the resin composition.

(4) After setting the resin composition through a drying step, the adhering material is removed thus forming first recessed portions which are adhesion marks (traces)) formed after the removal of adhering material. Thereafter, second recessed portions are also formed on the surface of the resin composition.

The mechanism by which the second recessed portions are formed is not clarified completely. However, it is estimated that such second recessed portions are openings which are formed when air bubbles are broken (broken bubble marks) or openings which are formed along with the removal of the adhering material which are in contact with the air bubbles from the resin composition. It is also considered that the second recessed portions are formed by other mechanisms. However, even if the above-estimated formation mechanism is incorrect, the evaluation of the present invention is not jeopardized at all by the misunderstanding of the mechanism.

(5) Drying and cross-linking of the resin composition are performed, and the glove is removed from the hand mold. Here, the cross-linking step may be omitted depending on a kind of resin used in the above-mentioned manufacturing method.

As the adhering material, a metal salt such as sodium chloride, sodium hydrogen carbonate, sodium carbonate, calcium nitrate, sodium biphosphate and calcium carbonate, sugars such as granulated sugar, an organic acid such as a citric acid and an ascorbic acid, wax and the like can be named. An inner diameter of the first recessed portion can be controlled by a particle size of the adhering material used in the manufacturing method. The inner diameter of the first recessed portion is set to 10 µm to 1 mm, for example, and is preferably set to 100 µm to 500 µm. Further, an inner diameter of the second recessed portion which is formed on the surface of the resin film including an inner surface of the first recessed portion is set to 1 µm to 100 µm, for example, and is preferably set to 20 µm to 50 µm.

For example, when the adhering material is a material such as sodium chloride, for example, which is dissolved in a solvent such as water, the adhering material can be removed by merely dissolving the adhering material using the solvent.

Further, as the adhering material, a material having sublimation property such as naphthalene, camphor, iodine, P-dichlorobenzene, and dry ice, or a material which is easily thermally decomposed such as carbonic acid ammonia can be used. In such a case, the adhering material can be removed by vaporization.

Further, glass beads, plastic beads, sands or the like can be also used as the adhering material. In such a case, for example, the adhering material can be removed by physically blowing the adhering material off the resin composition.

Here, the non-support-type gloves are manufactured by the substantially equal manufacturing method as the support-type gloves except for whether or not the gloves include the glove substrate. Accordingly, the explanation of the non-support-type gloves is omitted here. Further, flocking treatment may be applied to an inner side of the gloves.

Hereinafter, the present invention is explained in further detail in conjunction with embodiments. However, the present invention is not limited to these embodiments.

Embodiments

FIG. 1 is an enlarged explanatory view showing a portion of gloves according to an embodiment 1 in cross section.

Support-type gloves are manufactured as follows. Here, manufacturing methods of comparison examples 1 to 3 and a control described later differ from the manufacturing method of the embodiment 1. However, all manufacturing methods are explained with respect to the support-type gloves.

0.5 parts by weight of ABS (alkylbenzene sulfonic acid soda), 1 part by weight of sulfur, 0.5 parts by weight of a cross-link accelerator BZ (dibutyl carbamic acid zinc), 3 parts by weight of zinc flower, and 1 part by weight of a thickener are added to 100 parts by weight of rubber solid content of NBR (nitrile rubber latex, rubber solid content: 43% by weight), and these components are mixed together thus obtaining a first NBR compounding liquid.

A portion of the first NBR compounding liquid is distributed to a different vessel, the first NBR compounding liquid in the vessel is mechanically foamed by agitating the first NBR compounding liquid using a mixer thus obtaining a second NBR compounding liquid containing air bubbles therein (liquid resin composition). The agitation is continued until a volume proportion that air bubbles occupy in the whole second NBR compounding liquid becomes approximately 20 vol %. That is, the agitation is continued until a volume of the second NBR compounding liquid becomes 120 mL from 100 mL due to containing of air bubbles. In measuring the volume of the second NBR compounding liquid, a measuring cylinder is used.

Using two kinds of NBR compounding liquid which are obtained as described above (the first NBR compounding liquid containing air bubbles and the second NBR compounding liquid containing no air bubbles), following treatments are applied to the glove substrate.

First of all, a knitted glove substrate is put on to a hand mold. The hand mold on which the glove substrate is put is immersed in an immersion bath filled with a coagulating agent (5 weight % of calcium nitrate methanol solution) and, thereafter, the hand mold is pulled up from the immersion bath, and is dried.

Next, the hand mold is immersed in an immersion bath filled with the first NBR compounding liquid and is pulled up from the immersion bath and, thereafter, is dried at a temperature of 70° C. for thirty minutes. Due to such steps, as shown in FIG. 1, the resin film 2 which is made of the first NBR compounding liquid and constitutes a penetration preventing film is formed on a surface of the glove substrate 1.

Next, the above-mentioned hand mold on which the resin film 2 is formed is immersed in an immersion bath which is filled with the second NBR compounding liquid containing air bubbles. After pulling up the hand mold from the immersion bath, before the second NBR compounding liquid formed on the surface of the hand mold is set, sodium chloride particles which constitute an adhering material are adhered to a surface of the second NBR compounding liquid in a state where a part or the whole of the sodium chloride particle bites into the surface. Thereafter, the hand mold is dried at a temperature of 70° C. for 15 minutes. Due to such steps, the second NBR compounding liquid containing air bubbles is set, and a resin film 3 (see FIG. 1, sodium chloride particles being omitted from the drawing) containing air bubbles into which a part or the whole of the respective sodium chloride particles bites is formed on the resin film 2.

Then, the sodium chloride particles which are adhered to the resin film 3 are removed by washing with water. Thereafter, after drying the mold at a temperature of 80° C. for 60 minutes, the cross-linking of the resin film 3 is performed at a temperature of 125° C. for 40 minutes thus obtaining the finished gloves.

On a surface of the resin film 3 (see FIG. 1) of the gloves obtained by the above-mentioned steps, a large number of first recessed portions 31 are formed due to adhesion marks (traces) of the removed sodium chloride particles. Further, a large number of second recessed portions 32 which are far smaller (finer) than the first recessed portions 31 in size are formed on the whole surface of the resin film 3 including the first recessed portions 31 which are indented from the surface of the resin film 3 due to opening of air bubbles 4 (each indicated by a circle in FIG. 1) contained in the resin film 3.

Here, as the manner of operation or an advantageous effect brought about by the formation of the first recessed portions 31 and the second recessed portions 32, portions 33 which project from the rest of the surface are formed on the surface of the resin film 3. Projecting portions 33 are formed mainly along with the formation of the first recessed portions 31.

In this embodiment, a diameter of the first recessed portion 31 is approximately 300 μm, and a diameter of the broken bubble mark which forms the second recessed portion 32 is approximately 40 μm.

In this embodiment, a total thickness of a resin layer constituted of the resin film 2 and the resin film 3 is adjusted to approximately 0.5 to 0.6 mm. The thickness of the resin layer is adjusted in the same manner with respect to the comparison examples 1 to 3 and the control.

COMPARISON EXAMPLE

Comparison Example 1

Figure 2:
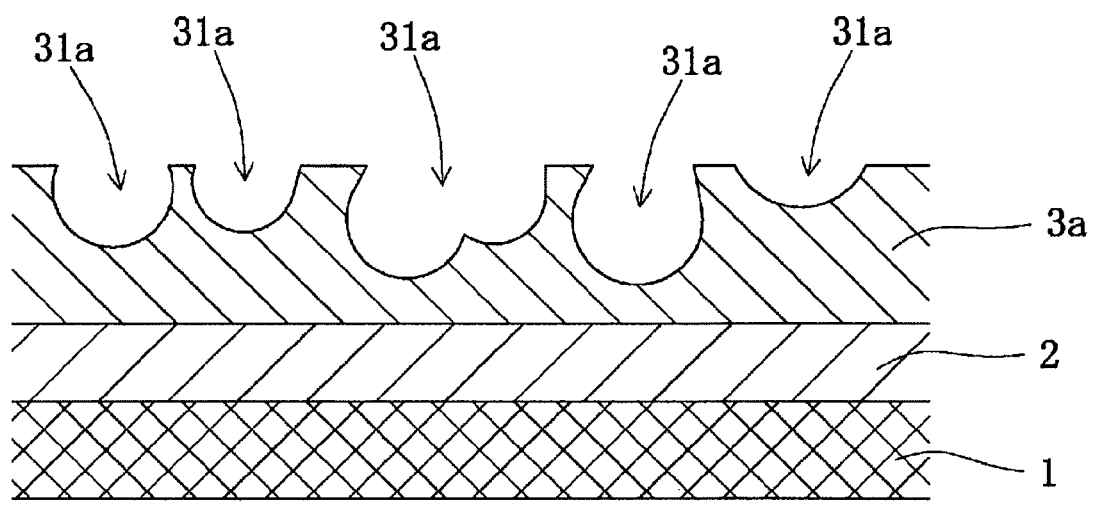
FIG. 2 is an enlarged explanatory view showing a portion of gloves according to a comparison example 1 in cross section.

FIG. 2 is an enlarged explanatory view showing a portion of gloves according to a comparison example 1 in cross section.

Here, parts identical or similar to the parts in the embodiment 1 shown in FIG. 1 are given same symbols, and the same goes for other comparison examples described later including the comparison example 2.

This comparison example 1 corresponds to a method described in the patent document 1, and a point which makes this comparison example 1 different from the embodiment 1 (see FIG. 1) lies in that a resin film 3a (see FIG. 2) is formed by only removing an adhering material without applying a foaming treatment to the resin film 3a. That is, the resin film 3a is formed using the first NBR compounding liquid containing no air bubbles in place of the second NBR compounding liquid containing air bubbles. In this comparison example 1, the gloves are manufactured under the same conditions and by the same steps as the embodiment 1 except for such a condition.

To be more specific, in the same manner as the embodiment 1, a hand mold on which glove substrate 1 is put is immersed in a coagulating agent and a first NBR compounding liquid in this order and, thereafter, a drying treatment is applied to the glove substrate 1 thus forming a resin film 2 on the surface of the glove substrate 1.

Next, to apply a surface treatment to a surface of the gloves, the hand mold on which the resin film 2 is formed is immersed in an immersion bath which is filled with the same first NBR compounding liquid (containing no air bubbles).

Thereafter, in the same manner as the embodiment 1, sodium chloride particles which constitute an adhering material are adhered to a surface of the resin film 2 and, thereafter, the adhering material is removed by washing with water. Then, the hand mold on which the resin film 1 is formed is subject to a drying step and a cross-linking step thus obtaining the finished gloves (comparison example 1).

In the same manner as the embodiment 1, a large number of first recessed portions 31a are formed on a surface of the resin film 3a (see FIG. 2) which is obtained in the above-described manner. However, different from the embodiment 1 (see FIG. 1), the resin film 3a contains no air bubbles therein and hence, fine second recessed portions attributed to air bubbles are not formed on an inner surface of the first recessed portions 31a.

Comparison Example 2

Figure 3:
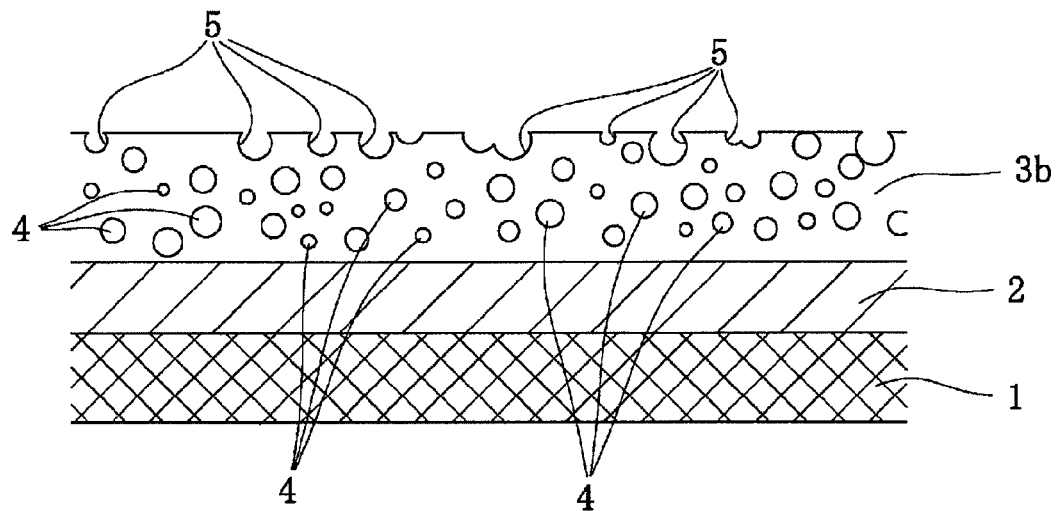
FIG. 3 is an enlarged explanatory view showing a portion of gloves according to a comparison example 2 in cross section.

FIG. 3 is an enlarged explanatory view showing a portion of gloves according to a comparison example 2 in cross section.

In the comparison example 2, different from the embodiment 1 (see FIG. 1), air bubbles are contained in a resin film 3b (see FIG. 3) by mechanical foaming without performing a treatment using an adhering material thus applying a surface treatment to a surface of a resin film 3b. In the comparison example 2, the gloves are manufactured under the same conditions and by the same steps as the embodiment 1 except for that the treatment using the adhering material is not performed.

That is, a hand mold on which a resin film 2 is formed is immersed in an immersion bath filled with a second NBR compounding liquid containing air bubbles and, thereafter, without being subject to the surface treatment using the adhering material, the hand mold on which a resin film 2 is formed is directly subject to a drying step and a cross-linking step thus obtaining the finished gloves (comparison example 2).

The resin film 3b (see FIG. 3) of the gloves which is obtained as described above contains, in the same manner as the embodiment 1 (see FIG. 1), a large number of air bubbles 4 therein. However, the surface treatment using the adhering material is not performed and hence, different from the embodiment 1 (see FIG. 1), the first recessed portions 31 are not formed on a surface of the resin film 3b. In place of the first recessed portions 31, however, fine recessed portions 5 are formed on a surface of the flat resin film 3b due to broken bubble marks of air bubbles 4 appearing on the surface of the resin film 3b.

Comparison Example 3

Figure 4:
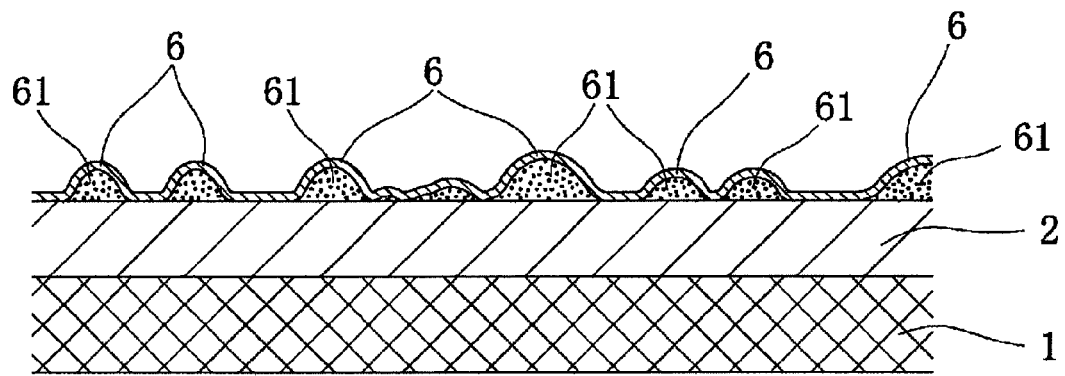
FIG. 4 is an enlarged explanatory view showing a portion of gloves according to a comparison example 3 in cross section.

FIG. 4 is an enlarged explanatory view showing a portion of gloves according to a comparison example 3 in cross section.

In the comparison example 3, rubber powder 61 is adhered to a surface of gloves without performing a foaming treatment and a surface treatment using an adhering material.

That is, in the same manner as the embodiment 1, a resin film 2 is formed on a surface of a glove substrate 1 and, then, 40 parts by weight of rubber powder 61 are added to 100 parts by weight of a first NBR compounding liquid (containing no air bubbles), and the hand mold on which the resin film 2 is formed is immersed in an NBR compounding liquid containing rubber powder 61. Thereafter, in the same manner as the embodiment 1, the hand mold is subject to a drying step and a cross-linking step thus obtaining the finished gloves (comparison example 3).

A large number of projecting portions 6 are formed on a surface of the gloves (see FIG. 4) which is obtained as described above due to the rubber powder 61.

[Control]

Figure 5:
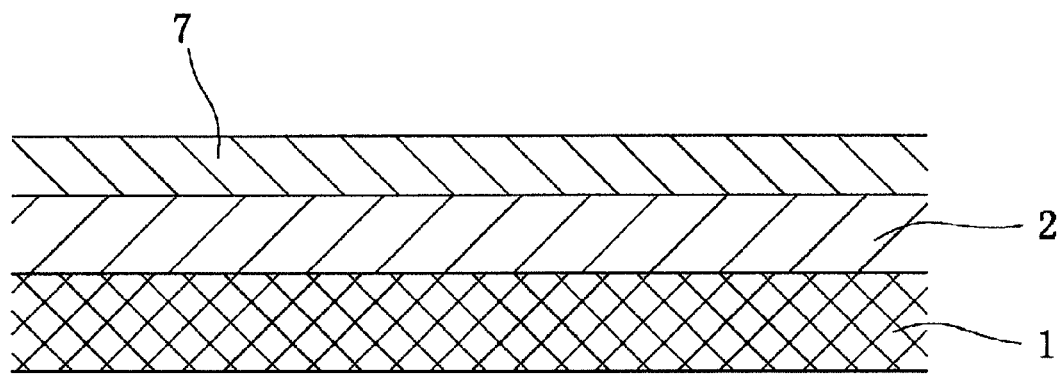
FIG. 5 is an enlarged explanatory view showing a portion of gloves according to a control in cross section.

FIG. 5 is an enlarged explanatory view showing a portion of gloves according to a control in cross section.

In the control, different from the above-mentioned embodiment and the comparison examples, none of the foaming treatment, the surface treatment using the adhering material, and the adhering treatment using the rubber particles and the like is performed. That is, in the same manner as the embodiment 1, a resin film 2 is formed on a surface of a glove substrate 1 using a first NBR compounding liquid and, then, a glove substrate 1 on which the resin film 2 is formed is immersed in the same first NBR compounding liquid (containing no air bubbles). Then, glove substrate 1 on which the resin film 2 is subject to a drying step and a cross-linking step. Due to such steps, gloves (control) having a flat resin layer 7 which does not possess a non-slip effect on a surface thereof are obtained.

[Experiments]

To evaluate gripping property and flexibility of the respective gloves which are obtained as described above, a measurement of friction coefficient and a test on finger-tip operability are performed with respect to the respective gloves.

(Evaluation of Gripping Property Based on Measurement of Friction Coefficient)

To evaluate a gripping force of the gloves which are obtained from the embodiment and the comparison examples, a friction coefficient μ of a surface of the gloves is measured. The friction coefficient μ is measured using a surface property measuring apparatus (HEIDON-14S/D), and the measurement is performed using a flat indenter having a diameter of 30 mm under a condition where velocity is set to 75 mm/min and a load is set to 200 g.

Here, nitrile rubber has been known as a material for manufacturing gloves possessing excellent oil resistance. Accordingly, in the experiment, a friction coefficient of the surface of the gloves when oil (JIS K6258 lubrication oil for testing No. 3) is used is measured with respect to the respective gloves, and measured friction coefficients are compared with each other. In general, the friction coefficient of the surface of the gloves when the above-mentioned oil is used takes a value ranging from to 0 to 1. The evaluation of the friction coefficient is made such that the closer the friction coefficient approaches to 0, the smaller the gripping force becomes, where the closer the friction coefficient approaches to 1, the larger the gripping force becomes.

(Evaluation of Flexibility Based on Test of Finger-Tip Operability)

Further, to evaluate the flexibility of the gloves, a finger-tip operability test is performed in accordance with the European Standards (EN: EN420). That is, the measurement is made on whether or not a person can carry a cylindrical pin having a fixed diameter for thirty seconds three times consecutively while wearing gloves on his hands. The EN standards define only level 1 to level 5 and hence, the evaluation of levels above the level 5 is not possible with the EN standards. Accordingly, the levels of flexibility above level 5 are determined as levels 6 to 10 in accordance with the Standards that our company uses. The flexibility is evaluated based on ten levels (level 1 (hard) to level 10 (flexible)) corresponding to a diameter of the pin. The relationship between the diameters of the respective used pins and the evaluation level is shown in a following Table 1.

TABLE 1

Evaluation method of finger-tip operability

| Evaluation | Pin diameter (mm) | Evaluation of finger-tip operability |
|---|---|---|
| Level 1 | 11.0 | Bad (hard) |
| Level 2 | 9.5 | ↑ |
| Level 3 | 8.0 | |
| Level 4 | 6.5 | |
| Level 5 | 5.0 | |
| Level 6 | 3.0 | |
| Level 7 | 2.0 | |
| Level 8 | 1.0 | |
| Level 9 | 0.8 | ↓ Good |
| Level 10 | 0.5 | (flexible) |

(Result of Experiment)

Figure 6:
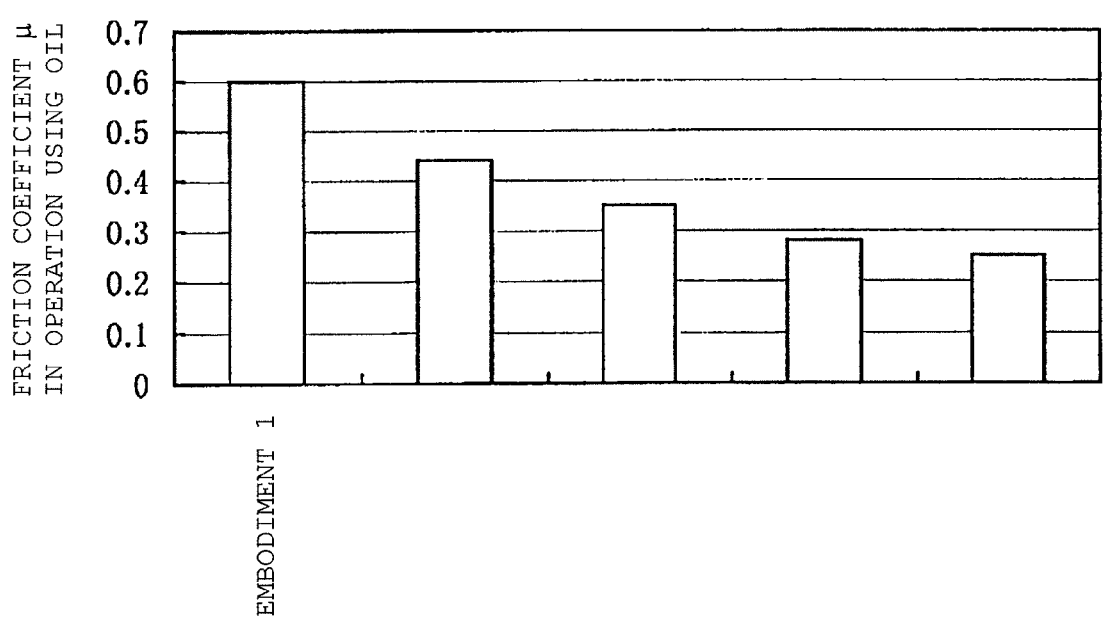
FIG. 6 is a graph showing a result of friction coefficients µ of respective gloves.

The friction coefficient μ and the result of experiment of finger-tip operability are shown in following Table 2 and, at the same time, the result of the friction coefficient μ is shown in FIG. 6 which is a graph.

TABLE 2

| No. | Frictional coefficient μ | Finger-tip operability | Non-slip property | Slip-preventing treatment |
|---|---|---|---|---|
| Embodiment 1 | 0.60 | Level 9 | possess | Combination of (mechanical) foaming and treatment using adhering material |
| Comparison Example 1 | 0.44 | Level 7 | possess | Only adhering substance |
| Comparison Example 2 | 0.35 | Level 8 | possess | Only foaming (by machine) |
| Comparison Example 3 | 0.28 | Level 7 | possess | Only rubber powder |
| Control | 0.25 | Level 6 | not possess | — |

(Evaluation)

As can be clearly understood from Table 2 and FIG. 6, first of all, the gloves manufactured by the method described in the embodiment 1 exhibits a high friction coefficient μ in an operation using oil compared to the manufacturing methods described in comparison examples 1 to 3.

That is, it is understood from Table 2 and FIG. 6 that the combination treatment (embodiment 1) which is the combination of the mechanical foaming and the treatment using the adhering material allows the gloves to exhibit the excellent gripping property compared to the single treatment using the adhering material (comparison example 1), the single treatment by foaming (comparison example 2) or the single treatment using rubber powder (comparison example 3).

Although the reason is not clearly understood yet, it is estimated that the second recessed portions 32 smaller than the first recessed portions 31 in size are formed in the inner surfaces of the first recessed portions 31 (see FIG. 1) which are formed by the adhesion marks of the removed adhering material and hence, compared to the comparison example 1 (see FIG. 2) in which only the first recessed portions 31a are formed, the number of recessed portions per a unit surface area can be largely increased thus imparting the excellent non-slip property to the gloves of the embodiment 1.

Further, the set resin film 3 contains the air bubbles 4 and hence, compared to the resin film including no air bubbles described in the comparison example 1, the gloves exhibit the excellent flexibility even when the respective resin films 3 have the same thickness. Particularly, in FIG. 1, the projecting portion 33 formed between the first recessed portion 31 and the first recessed portion 31 contains air bubbles 4 therein and hence, the projecting portion 33 exhibits the flexibility whereby the projecting portion 33 is easily deformed in a laterally inclined manner (toward the first recessed portion 31 side) in FIG. 1 by receiving a pressure from the outside.

That is, it is considered that when a user grips an article with the work gloves of the embodiment 1, the projecting portions 33 (see FIG. 1) of the resin film 3 are brought into contact with the article and are deformed in a laterally inclined manner, and the deformed projecting portions 33 function just like tufts of a carpet thus exhibiting the excellent non-slip effect.

Here, with respect to the gloves of the control, it is understood that the friction coefficient μ of the gloves of the control is smaller than the friction coefficients of other gloves, and the gripping property of the gloves of the control is lowest among four gloves compared with each other.

Further, it is understood that the gloves of the embodiment 1 are excellent in the finger-tip operability compared to the gloves of the comparison examples 1 to 3 and the control (see table 2) so that the gloves of the embodiment 1 possess excellent flexibility.

FIG. 7 to FIG. 11 are views respectively showing microscope photographs (magnification: 60 times) of the resin films of the respective gloves according to embodiment 1, the comparison examples 1 to 3 and the control in an enlarged manner. In the respective drawings, a distance between vertical lines arranged parallel to each other in the lateral direction is set to 0.5 mm.

Figure 7:
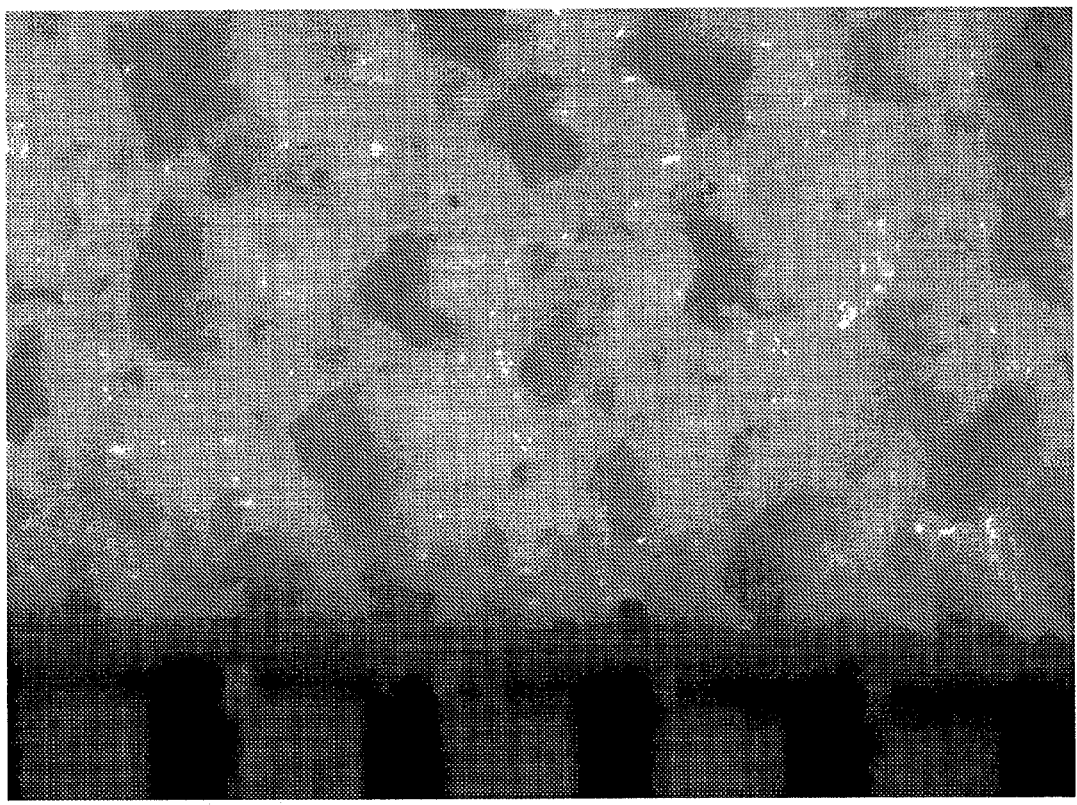
FIG. 7 is a microscope photograph (magnification: 60 times) showing a resin film of the gloves according to the embodiment 1 in an enlarged manner.
Figure 8:
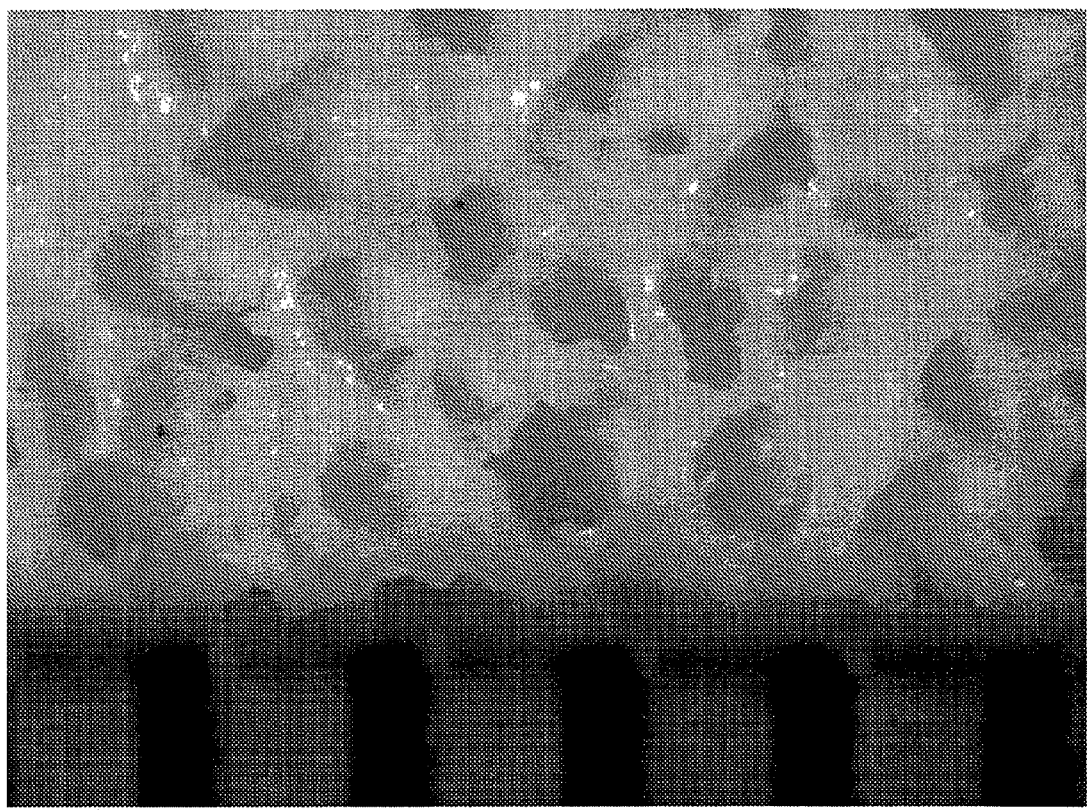
FIG. 8 is a microscope photograph (magnification: 60 times) showing a resin film of the gloves according to the comparison example 1 in an enlarged manner.
Figure 9:
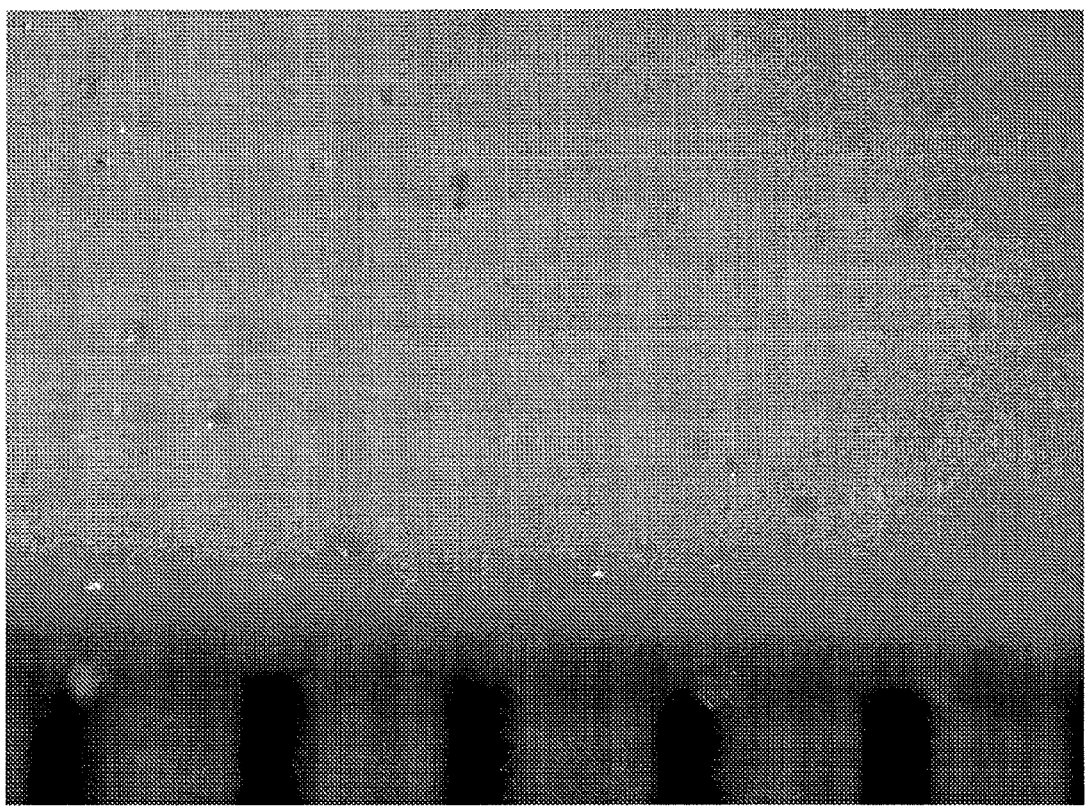
FIG. 9 is a microscope photograph (magnification: 60 times) showing a resin film of the gloves according to the comparison example 2 in an enlarged manner.
Figure 10:
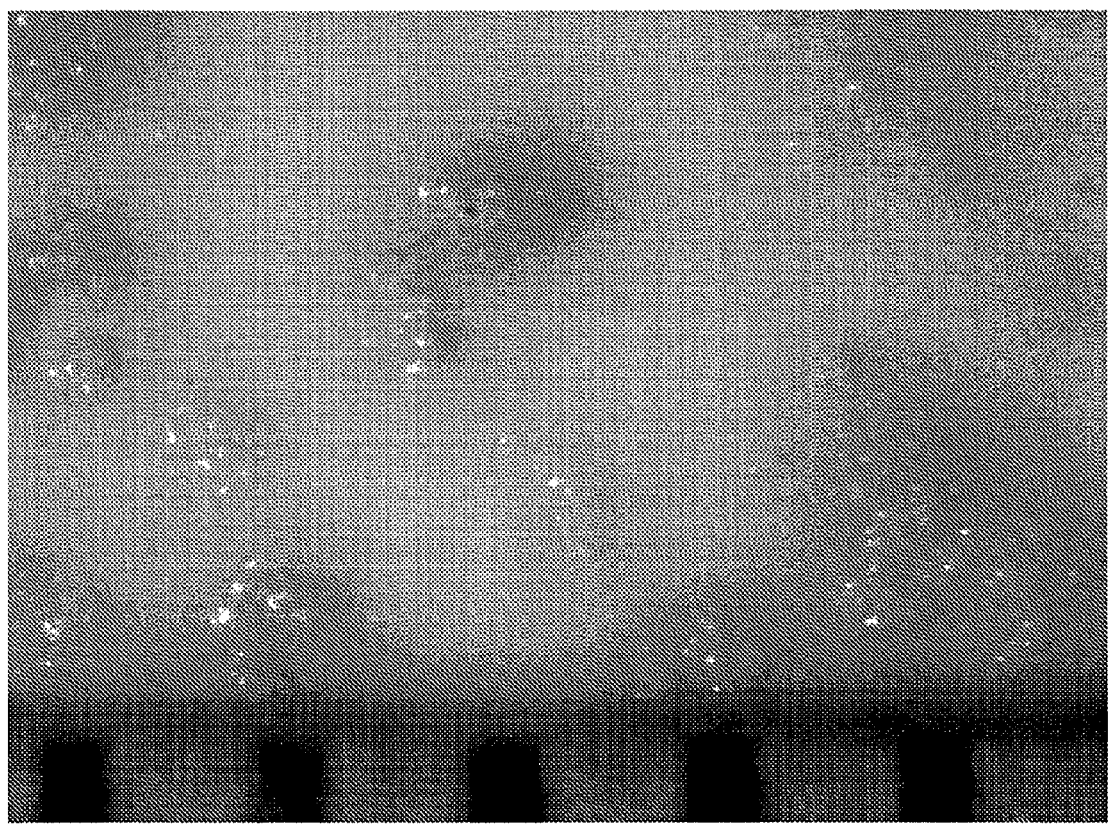
FIG. 10 is a microscope photograph (magnification: 60 times) showing a resin film of the gloves according to the comparison example 3 in an enlarged manner.
Figure 11:
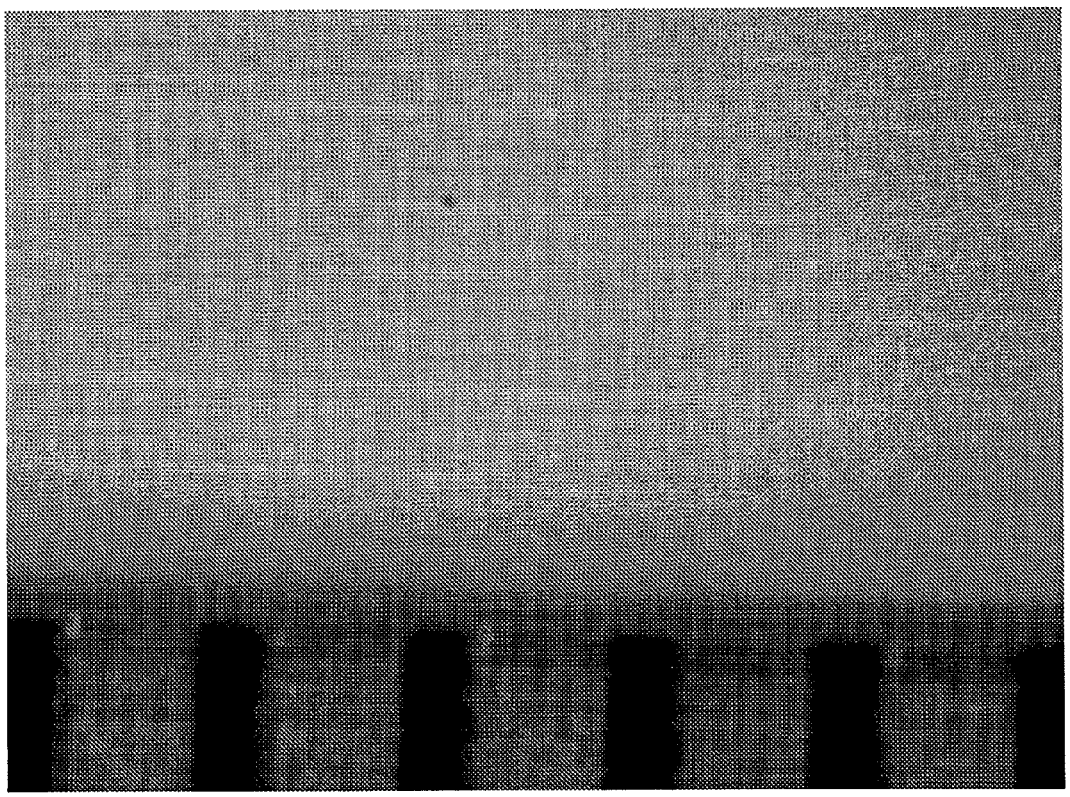
FIG. 11 is a microscope photograph (magnification: 60 times) showing a resin film of the gloves according to the control in an enlarged manner.

FIG. 7 shows the resin film of the gloves of the embodiment 1 (the combination treatment of the mechanical foaming and the treatment using the adhering material), FIG. 8 shows the resin film of the gloves of the comparison example 1 (only the adhering material), FIG. 9 shows the resin film of the gloves of the comparison example 2 (only the mechanical foaming), FIG. 10 shows the resin film of the gloves of the comparison example 3 (only the rubber powder), and FIG. 11 shows the resin film of the gloves of the control.

As can be understood from the respective microscope photographs, in the control (FIG. 11), the surface irregularities which exhibit a non-slip effect are not confirmed. On the other hand, it is clearly confirmed that the recessed portions formed by the embodiment 1 (FIG. 7) and the comparison example 1 (FIG. 8) are large compared to the recessed portions formed by the comparison example 2 (FIG. 9) and the comparison example 3 (FIG. 10).

It is also clearly confirmed that, different from the comparison example 1, in the embodiment 1, a large number of second recessed portions smaller than the first recessed portions in size are formed on the inner surfaces of the first recessed portions having a large diameter and on the surface of the resin film.

The influence which an average diameter of air bubbles contained in the resin film 3 exerts on the wear resistance is examined.

The wear resistance test is carried out in accordance with the Taber wear resistance test (JIS K6264-2: load; 4.9N, wear ring; H22, rotational speed; 60 rpm). This wear resistance test is carried out such that a pair of wear rings is pushed to a rotating test piece with a predetermined load so as to generate wear on the wear rings. The evaluation of the present invention is made based on the number of rotations till breaking and a wear rate. Here, the "number of rotations till breaking" means the number of rotations of the wear rings until the gloves are broken and hence, the larger the number of rotations of the wear rings, the larger wear resistance the gloves possess. The "wear rate" means a value which is obtained by converting a total worn quantity of the test piece until the wear resistance test is finished into an average worn quantity per 1000 rotations and hence, the smaller the wear rate, the larger wear resistance the gloves possess.

The average diameter of the air bubbles is measured by observing particle sizes ($d_i$) and the number ($n_i$) of air bubbles in an arbitrary area using a microscope, and is expressed as a length average diameter. Here, the "length average diameter" is an average diameter which is obtained by a formula $\Sigma(n_i d_i^2)/\Sigma(n_i d_i)$. The result of the wear resistance test is shown in the following Table 3.

TABLE 3

| | length average diameter(μ) | | | | | | | | |
|---|---|---|---|---|---|---|---|---|---|
| | 178 | 141 | 125 | 110 | 100 | 88 | 63 | 50 | 35 |
| number of rotations till breaking (time) | 500 | 500 | 1000 | 2000 | 3500 | 4500 | 5000 | 6000 | 6500 |
| wear rate (g/1000 times) | 0.68 | 0.60 | 0.31 | 0.18 | 0.08 | 0.05 | 0.03 | 0.02 | 0.02 |

From the results of the above-mentioned test, it is found that when the average diameter of the air bubbles contained in the resin film 3 is 100 μm or less, the wear resistance is sharply increased and, particularly, when the average diameter is 50 μm or less, the number of rotations till breaking is 6000 times or more and hence, the gloves exhibit the sufficient wear resistance in practical use.

Further, the influence which a quantity of air bubbles contained in the resin film 3 exerts on the wear resistance and the gripping property is examined. The wear resistance test method and a wear rate adopted here are equal to the wear resistance test method and the wear rate adopted by the above-mentioned measurement of the average diameter of air bubbles. Further, a measuring method of the friction coefficient is equal to the measuring method adopted by the above-mentioned experiment.

TABLE 4

Influence which quantity of air bubbles contained in resin film exerts on wear resistance and gripping property

| | quantity of air bubbles (vol %) | | | | | | | | | |
|---|---|---|---|---|---|---|---|---|---|---|
| | 0 | 3 | 5 | 10 | 15 | 20 | 25 | 30 | 40 | 60 | 80 |
| number of rotations till breaking (time) | 13000 | 12000 | 10000 | 9000 | 7000 | 6500 | 5000 | 4000 | 1500 | 500 | 500 |
| friction coefficient | 0.30 | 0.33 | 0.39 | 0.40 | 0.41 | 0.40 | 0.41 | 0.42 | 0.44 | 0.50 | 0.53 |

From the results of the above-mentioned test, when the quantity of air bubbles contained in the resin film 3 is 40 vol %, or more, the wear resistance is halved or is decreased more compared to a case where the quantity of air bubbles is 30 vol %. Accordingly, it is more preferable to set the quantity of air bubbles to 30 vol % or less. Further, when the quantity of air bubbles contained in the resin film 3 is 5 vol % or more, the friction coefficient is largely changed compared to a case where the quantity of air bubbles is 3 vol %. Accordingly, from a viewpoint of the gripping property, it is preferable to set the quantity of air bubbles to 5 vol % or more. To take the wear resistance and the gripping property into consideration based on the above-mentioned factors, it is preferable to set the quantity of air bubbles to a value which falls within a range from 5 to 30 vol % in practical use.

Here, there may be a case that priority is assigned to the wear resistance over the gripping property depending on an environment where the gloves are used. In such a case, a quantity of air bubbles contained in the resin film 3 is preferably set to a value which falls within a range from 5 to 10 vol %.

Here, terms and expression used in this specification are used for merely explaining the present invention and are not used in a limitative manner, and the specification does not exclude the use of terms and expressions equivalent to the terms and the expressions used above. Further, the present invention is not limited to the embodiments which have been explained in conjunction with drawings, and various modifications are conceivable without departing from a scope of the technical concept of the present invention.

Further, although numerals which are used in the drawings are described in claims in parentheses for facilitating the understanding of contents described in claims, the contents described in claims are not limited to the contents described in the drawings.

(a) According to the method of the present invention for forming a resin surface of the present invention, the first recessed portions are formed by allowing the granular and/or powdery adhering material to adhere to the surface of the unset resin composition containing air bubbles in a state where a part or the whole of the granular and/or powdery adhering material bites into the surface and by removing the adhesive materials after the resin composition is set, and the second recessed portions smaller than the first recessed portions in size are formed by allowing the air bubbles contained in the unset or set resin composition to open on the surface of the resin composition. Accordingly, compared to a method which forms only the first recessed portions by removing the adhering material, it is possible to largely increase the number of recessed portions per a unit surface area. As a result, the resin surface exhibits an excellent non-slip effect.

Further, air bubbles are contained in the set resin composition and hence, compared to the resin composition in which air bubbles are not contained, the latter resin composition exhibits an excellent flexibility even when these resin compositions have the same thickness.

(b) According to the method of the present invention for manufacturing an article which forms recessed portions different in size randomly on a surface thereof, it is possible to manufacture the article having the resin surface which exhibits an excellent non-slip effect and flexibility.

(c) The article which forms recessed portions different in size randomly on a surface thereof has the resin surface exhibiting an excellent non-slip effect and flexibility.

(d) According to the method of the present invention for manufacturing gloves, it is possible to manufacture gloves which exhibit an excellent non-slip effect and flexibility.

(e) The gloves of the present invention exhibit an excellent non-slip effect and flexibility.

(f) According to the gloves which includes at least the resin film containing no air bubbles underneath the resin film which contains the air bubbles, the resin film which contains no air bubbles prevents the penetration of liquid such as water or oil and hence, when a user handles liquid such as water or oil while wearing the gloves, it is possible to prevent the infiltration of liquid to a hand side.

The invention claimed is:

1. An article having a resin surface on which recessed portions different in size are formed randomly, the article comprising:

first recessed portions which are formed by allowing at least one of granular or powdery adhering material to adhere to a surface of an unset resin composition containing air bubbles so that at least a portion of the granular or powdery adhering material bites into the surface and by removing the adhering material after the resin composition is set, and second recessed portions which are smaller than the first recessed portions in size and are formed by allowing some of the air bubbles contained in the unset or set resin composition to open on said surface of the resin composition, the second recessed portions being openings which are formed on the surface of the resin composition when some air bubbles that are contained in the resin composition are broken when removal of the adhering material which is adhered to the surface of the resin composition occurs, wherein an inner diameter of the first recessed portions is in the range of 100 μm to 500 μm, a plurality of the second recessed portions are formed across the entirety of the resin surface so as to be formed across internal surfaces of the first recessed portions comprising depressions on the resin surface, the resin composition comprises a material selected from the group consisting of natural rubber, acrylonitrile-butadiene rubber and chloropene rubber, either alone or in combination, the air bubbles comprise 5 to 30 vol % of the resin composition, and an average diameter of the air bubbles is 50 μm or less.

2. A glove which includes recessed portions different in size randomly, comprising:

first recessed portions and second recessed portions which are smaller than the first recessed portions in size formed on a surface of a resin film containing air bubbles, the first recessed portions comprising traces on the surface of the resin film formed by allowing at least one of granular or powdery adhering material to adhere to the surface of the resin so that at least a portion of the granular or powdery adhering material bites into the surface of the resin film and thereafter removing the granular or providing adhering material from the surface of the resin film, and the second recessed portions being formed by allowing some of the air bubbles contained in the resin film to open, the second recessed portions being openings which are formed on the surface of the resin film when some air bubbles that are contained in the resin film are broken when removal of the adhering material which is adhered to the surface of the resin film occurs, wherein an inner diameter of the first recessed portions is in the range of 100 μto 500 m, a plurality of the second recessed portions are formed across the entirety of the surface of the resin film so as to be formed across internal surfaces of the first recessed portions comprising depressions on the surface of the resin film, the resin film comprises a material selected from the group consisting of natural rubber, acrylonitrile-butadiene rubber and chloropene rubber, either alone or in combination, the air bubbles comprise 5 to 30 vol % of the resin film, and an average diameter of the air bubbles is 50 μm or less.

3. The glove according to claim 2, further comprising, underneath the resin film containing said air bubbles, a resin film containing no air bubbles.

* * * * *